United States Patent [19]
Besenmatter et al.

[11] 3,989,349
[45] Nov. 2, 1976

[54] REFLEX FINDER
[75] Inventors: Walter Besenmatter; Trude Muszumanski, both of Vienna; Gunter Kurz, Vosendorf, all of Austria
[73] Assignees: Karl Vockenhuber; Raimund Hauser, both of Vienna, Austria
[22] Filed: Feb. 4, 1974
[21] Appl. No.: 439,629

[30] Foreign Application Priority Data
Feb. 6, 1973 Austria .................... 1031/73

[52] U.S. Cl. .................... 350/33; 350/8; 350/54; 350/184; 350/230; 354/155; 354/222
[51] Int. Cl.[2] .................. G02B 23/04; G03B 13/06
[58] Field of Search ........... 350/8, 184, 202, 230, 350/232, 175 E, 54, 33; 354/155, 222; 352/206

[56] References Cited
UNITED STATES PATENTS
2,850,945  9/1958   Kohler ..................... 350/232 X
3,010,367  11/1961  Miles ...................... 350/230 X
3,043,181  7/1962   Brown et al. ............... 354/222
3,045,545  7/1962   Korones et al. ............. 350/232 X
3,062,102  11/1962  Martin ..................... 354/155 X
3,127,809  4/1964   Denk ....................... 352/206 X
3,230,851  1/1966   Reymond .................... 354/155
3,722,979  3/1973   Mikami ..................... 350/54
3,751,136  8/1973   Kirchhoff .................. 350/184 X Primary Examiner—David H. Rubin
Attorney, Agent, or Firm—Ernest G. Montague; Karl F. Ross; Herbert Dubno

[57]               ABSTRACT

A camera of the reflex type comprises a view finder with an achromatic finder objective, an eyepiece, and an interposed inverting lens group. The finder objective includes a negative-meniscus lens of relatively low Abbé number and a biconvex lens of relatively high Abbé number. The negative-meniscus lens, which has a concave forward surface, may be air-spaced from the biconvex lens or may be cemented thereto to form a doublet; in the latter instance the doublet is preceded by a positive, biconvex or planoconvex, front lens.

18 Claims, 5 Drawing Figures

REFLEX FINDER

FIELD OF THE INVENTION

The invention relates to a reflex finder for cameras, more particularly cine cameras of the super-8 format, comprising a finder objective and a finder eyepiece with a fixed exit pupil.

STATE OF THE ART

In recent times the development of cine cameras has been accompanied by attempts to create particularly fast taking objectives which, in cooperation with highly light-sensitive film material, enable photographs to be taken even under extremely unfavorable light conditions. Objectives of this kind are marketed under the description "available-light lenses".

Filming under available light makes exceptional demands not only on the taking objective and film emulsion but also on the finder so that relatively dark objects in a dark background can be recognized without any particular strain. The diameter of the finder exit pupil may be regarded as a measure for the finder brightness. This applies for as long as the diameter of the pupil of the human eye exceeds the diameter of the exit pupil, the diameter of the human pupil under the given circumstances being assumed to be between 5 and 6 millimeters.

It is possible on the one hand to increase the diameter of the exit pupil by proportionally increasing the finder objective and finder eyepiece. However, since space is generally very limited in the design of a camera this solution is unsatisfactory. It would also be possible to increase the diameter of the exit pupil by enlarging the focal length of the eyepiece but then the telescopic magnification of the finder diminishes with an increasing focal length of the eyepiece and the finder image thus offered becomes too small.

In order to obtain a finder brightness measure which is independent of the structural length, the numerical diaphragm B of the finder may be expressed by the relationship $$B = \frac{f_{ok}}{AP} = \frac{f_{obj}}{EP}$$

where AP and EP refer to the diameters of the exit pupil and the entrance pupil respectively, $f_{OK}$ refers to the focal length of the eyepiece and $f_{obj}$ refers to the focal length of the finder objective, counting all optical elements in the optical finder path between the object and a first real intermediate image.

The stop numbers in reflex finders which have been disclosed in the art in two available publications are approximately B = 6 to 10. Data published in one of the two publications, i.e. German patent application No. 1,422,735 show that the focal length of the finder objective $f_{obj}$ is equal to the focal length of the finder eyepiece, $f_{OK}$ and amounts to approximately 22.8. The diameter of the exit pupil or entrance pupil is stated to be 2.5. This provides a stop number of B = 9.1. The focal length of the objective and of the eyepiece in the finder that is described in the other publication, i.e. German Pat. No. 2,127,145 is 17.8 and the diameter of the exit pupil or entrance pupil is 2.0. The stop number which can be calculated therefrom has a value of 8.9. These stop numbers are inadequate for filming under conditions of unfavorable lighting when a stop number of approximately 3.4 is desirable.

OBJECT OF THE INVENTION

It is the object of the invention to create a finder which provides a satisfactorily bright image, even under poor lighting conditions.

SUMMARY OF THE INVENTION

In accordance with the present invention there is provided a camera having a reflex finder comprising a finder objective and a finder eyepiece with a fixed exit pupil, the finder objective being provided with an achromatic component which comprises a biconvex lens of relatively high Abbe number and a negative-meniscus lens of relatively low Abbe number which is concavely curved in the direction of the incident light, the lenses of this group satisfying the following condition:

$$r_A > 0.3 f_A$$

in which any given lens radius of the finder objective is designated with $r_A$ and the focal length of that finder objective is designated with $f_A$.

Our improved view finder may be based on a stop number of approximately 3.4 obtainable with a wide-angle eyepiece although, as will become apparent from the following examples, a specially constructed wide-angle eyepiece is not essential. The surfaces of greater curvature of both lenses of the achromatic component face each other so that an air lens with negative refractive power is produced between the biconvex lens and the meniscus if the lenses are not cemented to each other.

The above-mentioned condition provides the additional advantage that no radius becomes smaller than the objective diameter of the finder lens so that manufacture of this objective is simple and economical.

To eliminate chromatic aberration, the difference between Abbé numbers of the glasses which constitute the achromatic component preferably amounts to at least 19.4.

In certain embodiments of our invention, the radius of curvature of the front surface of the biconvex lens which faces the incident light is between 1.6 times and 2.3 times the focal length of the finder objective, the middle or axial thickness of the negative meniscus lens is between 0.08 times and 0.2 times the focal length of the finder objective and the refractive index of the biconvex lens is between 1.62 and 1.75.

Since the diameter of the finder objective is defined by the inclined incident ray pencils, it follows that aberrations such as astigmatism, image-field curvature, distortion and coma, which occur mainly on the image edge, also occur in the eyepiece and have to be eliminated for the entire visible spectrum. In this sense the focal length of the eyepiece has a substantial significance. It is therefore advantageous if the lens group representing the eyepiece in a reflex finder is a wide-angle component having a stop number of approximately 3.4 expressed by the ratio of the focal length of the finder eyepiece to the diameter of the exit pupil or by the ratio of the focal length of the finder objective to the diameter of the entrance pupil. This component advantageously comprises four lenses, the lens facing the finder objective being negative but the other three lenses being positive, the middle thicknesses of the three positive lenses being designated with $d_{C2}$, $d_{C3}$ and $d_{C4}$ and the focal length of the eyepiece, designated $f_{OK}$, being preferably subject to the following condition:

$$d_{C2,3,4} > 0.3 f_{OK}$$

BRIEF DESCRIPTION OF THE DRAWING

The invention will now be described in more detail, by way of example, with reference to the accompanying drawing, in which.

SPECIFIC DESCRIPTION

Figure 1:
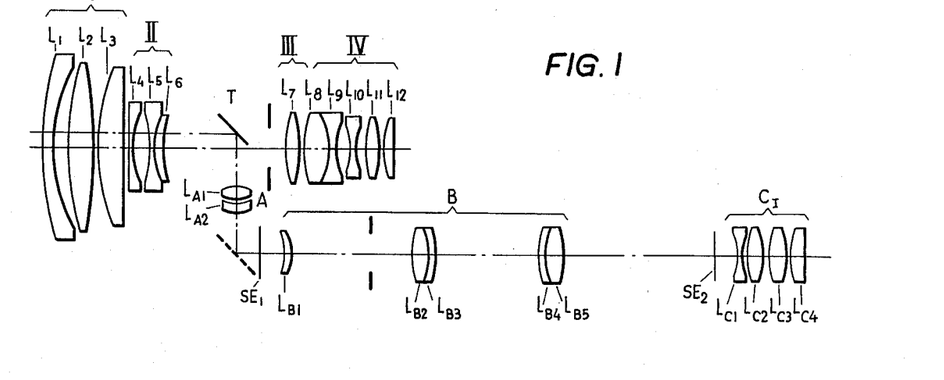
FIGS. 1 and 1A show a fast taking objective in the position of minimum focal length in conjunction with a reflex finder according to our invention including a wide-angle eyepiece.
Figure 1A:
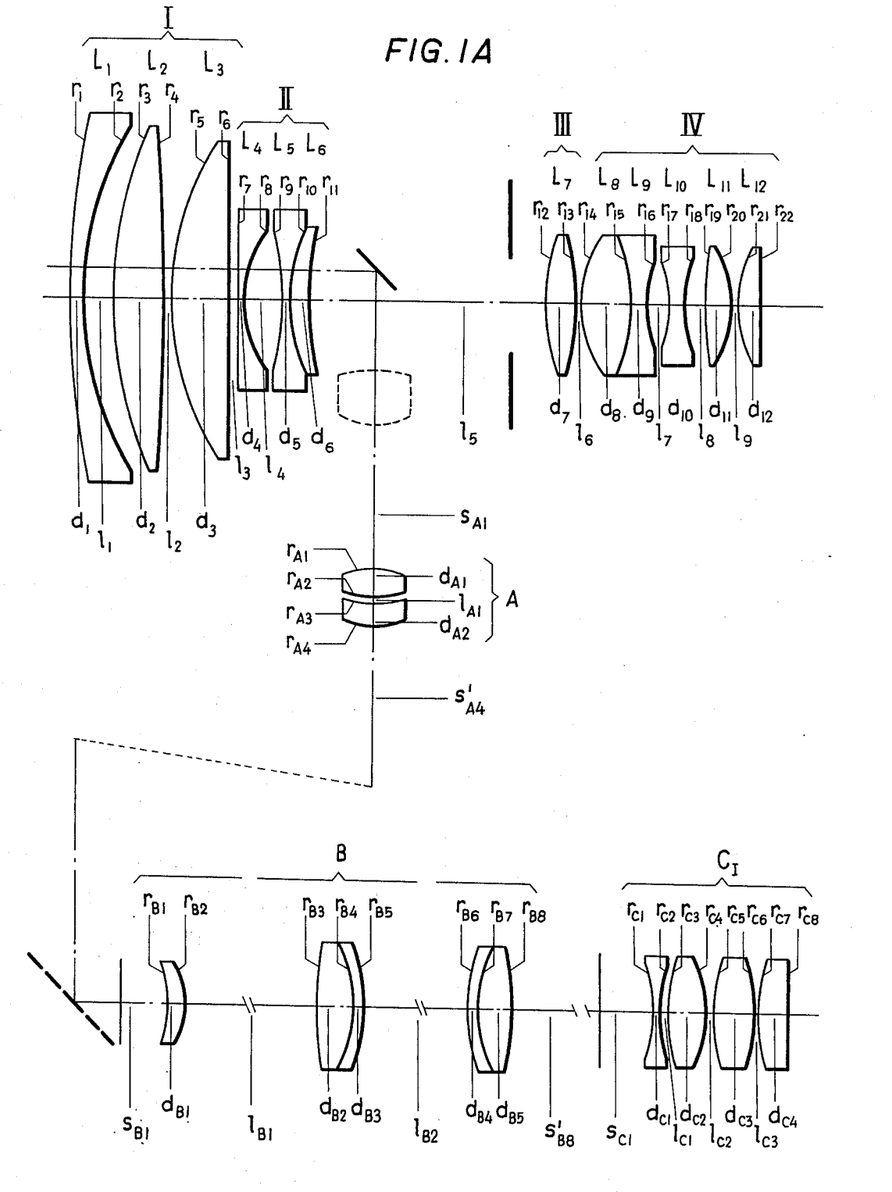

The taking objective of FIGS. 1 and 1A comprises a supplementary lens group of variable magnification and a base lens group of fixed focal length. The supplementary lens group comprises a positive front component I with lenses $L_1$, $L_2$, $L_3$ followed by a negative component II with lenses $L_4$ and $L_5/L_6$, the negative component II being slidable along the optical axis for the purpose of changing the magnification and performing the compensating motion which is required to maintain a constant image position. The basic lens group IV is preceded by a positive element III in the form of a single lens $L_7$ that follows the negative component II, the element III being adapted to collect the ray pencils which diverge behind the diaphragm space so that they strike the basic lens group IV in the axially parallel or converging direction. The basic lens group IV incorporates a cemented element $L_8/L_9$ which is adjacent to the positive element III and is followed by a biconcave lens $L_{10}$ and two biconvex lenses $L_{11}/L_{12}$. Among the radii of the basic lens group none is shorter than 0.6 times the overall focal length of the elements III + IV, the refractive index of all biconvex lenses being less than 1.72. The following conditions could also be satisfied in order to eliminate aberrations:

$$0.7 r_{16} < r_{12} < 2.1 r_{16}$$

$$0.03 f_{III} < d_{neg} < 0.55 f_{III}$$

($d_{neg}$ being the axial width of the negative component II).

In the following tables the radii have been designated with $r$, the lens thicknesses with $d$, the air spaces with $l$, the refractive indeces with $n_d$ and the Abbé numbers with $\nu_d$.

TABLE I

|  |  |  |  |  | $n_d$ | $\nu_d$ |  |
|---|---|---|---|---|---|---|---|
| $L_1$ | $r_1$ | +8.706 | | | | | |
| | | | $d_1$ | = 0.15 | / 1.805 / | 25.4 | |
| | $r_2$ | +2.628 | | | | | |
| | | | $l_1$ | = 0.21 | | | |
| | $r_3$ | +3.408 | | | | | |
| $L_2$ | | | $d_2$ | = 0.43 | / 1.603 / | 60.6 | |
| | $r_4$ | −18.304 | | | | | |
| | | | $l_2$ | = 0.01 | | | |
| | $r_5$ | +2.278 | | | | | |
| $L_3$ | | | $d_3$ | = 0.52 | / 1.658 / | 50.9 | |
| | $r_6$ | −130.310 | | | | | |
| | | | $l_3$ | $\begin{cases} 0.05 & f_{min} \\ 0.78 & f_M \\ 1.21 & f_{max} \end{cases}$ | | | |
| | $r_7$ | +40.501 | | | | | |
| $L_4$ | | | $d_4$ | = 0.08 | / 1.713 / | 53.8 | |
| | $r_8$ | +0.999 | | | | | |
| | | | $l_4$ | = 0.24 | | | |
| | $r_9$ | −3.780 | | | | | |
| $L_5$ | | | $d_5$ | = 0.08 | / 1.641 / | 60.1 | |
| | $r_{10}$ | +1.170 | | | | | |
| $L_6$ | | | $d_6$ | = 0.21 | / 1.847 / | 23.8 | |
| | $r_{11}$ | +4.173 | | | | | |
| | | | $l_5$ | $\begin{cases} 2.06 & f_{min} \\ 1.63 & f_M \\ 0.90 & f_{max} \end{cases}$ | | | |
| | $r_{12}$ | +2.794 | | | | | |
| $L_7$ | | | $d_7$ | = 0.21 | / 1.717 / | 48.0 | |
| | $r_{13}$ | −3.655 | | | | | |
| | | | $l_6$ | = 0.01 | | | |
| | $r_{14}$ | +0.955 | | | | | |
| $L_8$ | | | $d_8$ | = 0.42 | / 1.657 / | 36.7 | |
| | $r_{15}$ | −1.513 | | | | | |
| $L_9$ | | | $d_9$ | = 0.17 | / 1.805 / | 25.4 | Group III + IV $f_{III+IV} = 1.23$ |
| | $r_{16}$ | +2.066 | | | | | |
| | | | $l_7$ | = 0.08 | | | |
| | $r_{17}$ | −2.166 | | | | | |
| $L_{10}$ | | | $d_{10}$ | = 0.19 | / 1.847 / | 23.8 | |
| | $r_{18}$ | +1.030 | | | | | |
| | | | $l_8$ | = 0.15 | | | |
| | $r_{19}$ | +5.136 | | | | | |
| $L_{11}$ | | | $d_{11}$ | = 0.23 | / 1.713 / | 53.8 | |
| | $r_{20}$ | −1.036 | | | | | |
| | | | $l_9$ | = 0.01 | | | |
| | $r_{21}$ | +0.946 | | | | | |
| $L_{12}$ | | | $d_{12}$ | = 0.23 | / 1.641 / | 60.1 | |
| | $r_{22}$ | −380.504 | | | | | |

$f_{min}$ = 0.594
$f_M$ = 1
$f_{max}$ = 1.683
relative aperture = 1:1.2

TABLE I-continued

|  |  | $n_d$ | $v_d$ |
|---|---|---|---|
| image-field diagonal | = 2 y = 0.54 | | |

This as well as the following examples show that all the initially mentioned conditions for the basic lens group are satisfied. This results not only in a fast objective but also in a short structural length without excessively short curvature radii, without the need for using special kinds of glass and with relatively low reflection losses.

Tables II and III give further examples for the basic lens group III, IV.

TABLE II

| | | | | | $n_d$ | $v_d$ | |
|---|---|---|---|---|---|---|---|
| $L_7$ | $r_{12}$ | +2.794 | $d_7$ | = 0.21 | / 1.717 / | 48.0 | |
| | $r_{13}$ | −3.655 | | | | | |
| | | | $l_6$ | = 0.01 | | | |
| $L_8$ | $r_{14}$ | +0.955 | $d_8$ | = 0.42 | / 1.657 / | 36.7 | |
| | $r_{15}$ | −1.513 | | | | | |
| $L_9$ | $r_{16}$ | +3.800 | $d_9$ | = 0.04 | / 1.805 / | 25.4 | |
| | | | $l_7$ | = 0.08 | | | |
| $L_{10}$ | $r_{17}$ | −2.166 | $d_{10}$ | = 0.19 | / 1.847 / | 23.8 | Group III+IV $f_{III+II}=1.17$ |
| | $r_{18}$ | +1.030 | | | | | |
| | | | $l_8$ | = 0.15 | | | |
| $L_{11}$ | $r_{19}$ | +5.136 | $d_{11}$ | = 0.23 | / 1.713 / | 53.8 | |
| | $r_{20}$ | −1.036 | | | | | |
| | | | $l_9$ | = 0.01 | | | |
| $L_{12}$ | $r_{21}$ | +1.153 | $d_{12}$ | = 0.23 | / 1.641 / | 60.1 | |
| | $r_{22}$ | +42.916 | | | | | |

TABLE III

| | | | | | $n_d$ | $v_d$ | |
|---|---|---|---|---|---|---|---|
| $L_7$ | $r_{12}$ | +4.180 | $d_7$ | = 0.21 | / 1.717 / | 48.0 | |
| | $r_{13}$ | −3.655 | | | | | |
| | | | $l_6$ | = 0.01 | | | |
| $L_8$ | $r_{14}$ | +0.955 | $d_8$ | = 0.42 | / 1.657 / | 36.7 | |
| | $r_{15}$ | −1.513 | | | | | |
| $L_9$ | $r_{16}$ | +2.066 | $d_9$ | = 0.17 | / 1.805 / | 25.4 | |
| | | | $l_7$ | = 0.08 | | | Group III+IV $f_{III+II}=1.48$ |
| $L_{10}$ | $r_{17}$ | −2.166 | $d_{10}$ | = 0.76 | / 1.847 / | 23.8 | |
| | $r_{18}$ | +1.064 | | | | | |
| | | | $l_8$ | = 0.15 | | | |
| $L_{11}$ | $r_{19}$ | +5.136 | $d_{11}$ | = 0.23 | / 1.713 / | 53.8 | |
| | $r_{20}$ | −1.036 | | | | | |
| | | | $l_9$ | = 0.01 | | | |
| $L_{12}$ | $r_{21}$ | +0.922 | $d_{12}$ | = 0.23 | / 1.658 / | 57.3 | |
| | $r_{22}$ | −12.883 | | | | | |

A beam splitter T, constructed as a prism or reflector, which separates the optical taking path from the optical finder path is provided behind the component II to reflect part of the incident light into the finder. In FIG. 1 the object which is assumed to be at infinity is projected by the supplementary lens group I, II so as to produce a virtual image at a position approximately 56.6 mm in front of a finder lens group A consisting of a biconvex lens $L_{A1}$ and a negative-meniscus lens $L_{A2}$. A real, inverted intermediate image is thus produced in the first focal plane $SE_1$ and this image is then projected by a reversing system B into a second focal plane $SE_2$, but upright and unreversed. The reversing system B includes a meniscus-shaped field lens positive $L_{B1}$ disposed close to the first focal plane as well as two biconvex doublets $L_{B2}$, $L_{B3}$ and $L_{B4}$, $L_{B5}$. The second focal plane is observed through a wide-angle lens group $C_I$ composed of four singlets, i.e. a biconcave lens $L_{C1}$, two biconvex lenses $L_{C2}$, $L_{C3}$ and a planoconvex lens $L_{C4}$.

Design data for the general construction of the finder lens group A of FIGS. 1 and 1A are disclosed in Tables IV, V and VI, the letter $s$ referring to the back-focal lengths.

TABLE IV

| | | | | $n_d$ | $v_d$ |
|---|---|---|---|---|---|
| | $r_{A1}$ +27.487 | $s_{A1}$ −56.6 | | | |
| $L_{A1}$ | | $d_{A1}$ 2.3 | | / 1.744 / | 44.8 |
| | $r_{A2}$ −7.167 | | | | |
| | | $l_{A1}$ 0.13 | | | |
| | $r_{A3}$ −6.100 | | | | |
| $L_{A2}$ | | $d_{A2}$ 2.4 | | / 1.805 / | 25.4 |
| | $r_{A4}$ −9.360 | | | | |
| | | $s_{A4}'$ 14.4 | | | |
| | First focal plane ($SE_1$) | | | | |

TABLE IV-continued

|  | | | $n_d$ | $v_d$ |
|---|---|---|---|---|
| | | $s_{B1}$ −5.0 | | |
| $L_{B1}$ | $r_{B1}$ −25.728 | $d_{B1}$ 2.0 | / 1.569 / | 63.1 |
| | $r_{B2}$ −12.103 | $l_{B1}$ 33.5 | | |
| $L_{B2}$ | $r_{B3}$ +65.750 | $d_{B2}$ 3.6 | / 1.615 / | 51.2 |
| $L_{B3}$ | $r_{B4}$ −11.691 | $d_{B3}$ 1.0 | / 1.728 / | 28.4 |
| | $r_{B5}$ −29.638 | $l_{B2}$ 28.2 | | |
| $L_{B4}$ | $r_{B6}$ +29.638 | $d_{B4}$ 1.0 | / 1.728 / | 28.4 |
| $L_{B5}$ | $r_{B7}$ +11.691 | $d_{B5}$ 3.6 | / 1.615 / | 51.2 |
| | $r_{B8}$ −65.750 | $s_{B8}'$ 38.29 | | |
| | | Second focal plane ($SE_2$) | | |
| | | $s_{C1}$ −5.33 | | |
| $L_{C1}$ | $r_{C1}$ −19.780 | $d_{C1}$ 1.2 | / 1.755 / | 27.6 |
| | $r_{C2}$ +19.780 | $l_{C1}$ 0.5 | | |
| $L_{C2}$ | $r_{C3}$ +24.170 | $d_{C2}$ 4.5 | / 1.658 / | 50.9 |
| | $r_{C4}$ −13.501 | $l_{C2}$ 0.1 | | |
| $L_{C3}$ | $r_{C5}$ +38.521 | $d_{C3}$ 4.5 | / 1.623 / | 58.1 |
| | $r_{C6}$ −38.521 | $l_{C3}$ 0.1 | | |
| $L_{C4}$ | $r_{C7}$ +19.174 | $d_{C4}$ 3.6 | / 1.623 / | 58.1 |
| | $r_{C8}$ ∞ | | | |

The axial thicknesses $d_{C2}, d_{C3}, d_{C4}$ all exceed 0.3 times the focal length $f_{OK}$ of the lens group $C_I$ constituting the eyepiece of the view finder which, from the values given above, can be calculated as $f_{OK}$ = 12.00. The lens group A according to Table IV has a focal length

TABLE V

|  | | | $n_d$ | $v_d$ |
|---|---|---|---|---|
| $L_{A1}$ | $r_{A1}$ +23.798 | $d_{A1}$ 2.3 | / 1.641 / | 60.1 |
| | $r_{A2}$ −6.151 | $l_{A1}$ 0.15 | | |
| $L_{A2}$ | $r_{A3}$ −5.284 | $d_{A2}$ 2.0 | / 1.805 / | 25.4 |
| | $r_{A4}$ −7.803 | | | |
| | | $f_{AII}$ = 12.103 | | |

TABLE VI

|  | | | $n_d$ | $v_d$ |
|---|---|---|---|---|
| $L_{A1}$ | $r_{A1}$ +20.0 | $d_{A1}$ 2.0 | / 1.620 / | 60.3 |
| | $r_{A2}$ −6.524 | $l_{A1}$ 0.4 | | |
| $L_{A2}$ | $r_{A3}$ −5.5 | $d_{A2}$ 1.0 | / 1.785 / | 25.8 |
| | $r_{A4}$ −8.177 | | | |
| | | $f_{AIII}$=12.460 | | |

Figure 2:
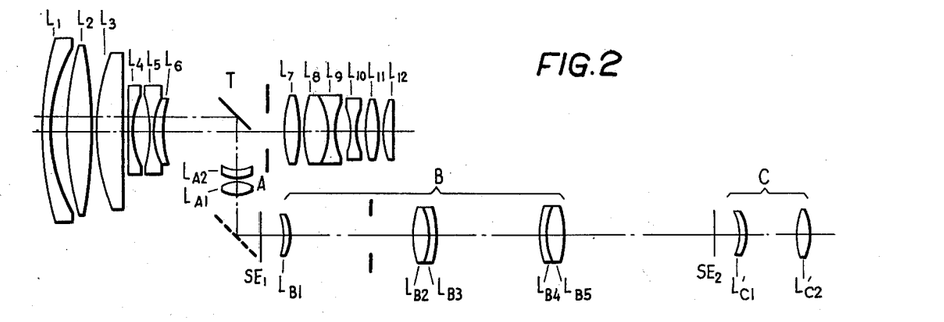
FIGS. 2 and 2A shows an optical system in conjunction with a fast taking lens of the same general type whose view finder includes a conventional eyepiece.
Figure 2A:
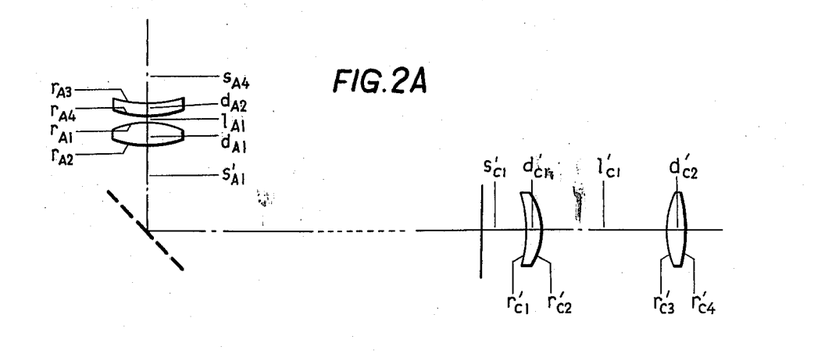

The diameter of the exit pupil amounts to approximately 5 mm in the system of FIGS. 2 and 2A in which, for the sake of increased finder brightness, we have replaced the wide-angle eyepiece of FIG. 1 by a conventional eyepiece C having a focal length of approximately $f_{OK}$ = 17.0, consisting of a positive-meniscus lens $L'_{C1}$ and a biconvex lens $L'_{C2}$. Since this practically reaches the physiological limit, any further increase of the diameter of the exit pupil hardly has any practical significance. In the finder objective of FIGS. 2 and 2A the position of the two lenses $L_{A1}$ and $L_{A2}$ has been interchanged. The design data for such a finder system are as follows:

|  | | | $n_d$ | $v_d$ |
|---|---|---|---|---|
| | | $s_{A1}$ −56.6 | | |
| $L_{A1}$ | $r_{A1}$ +27.487 | $d_{A1}$ 2.3 | / 1.744 / | 44.8 |
| | $r_{A2}$ −7.167 | $l_{A1}$ 0.13 | | |
| $L_{A2}$ | $r_{A3}$ −6.100 | $d_{A2}$ 2.4 | / 1.805 / | 25.4 |
| | $r_{A4}$ −9.360 | | | |
| | | $s_{A4}'$ 14.4 | | |
| | | First focal plane $SE_1$ | | |
| | | $s_{B1}$ −5.0 | | |
| $L_{B1}$ | $r_{B1}$ −25.728 | $d_{B1}$ 2.0 | / 1.569 / | 63.1 |
| | $r_{B2}$ −12.103 | $l_{B1}$ 33.5 | | |
| $L_{B2}$ | $r_{B3}$ +65.750 | $d_{B2}$ 3.6 | / 1.615 / | 51.2 |
| $L_{B3}$ | $r_{B4}$ −11.691 | $d_{B3}$ 1.0 | / 1.728 / | 28.4 |
| | $r_{B5}$ −29.638 | $l_{B2}$ 28.2 | | |
| $L_{B4}$ | $r_{B6}$ +29.638 | $d_{B4}$ 1.0 | / 1.728 / | 28.4 |
| $L_{B5}$ | $r_{B7}$ +11.691 | $d_{B5}$ 3.6 | / 1.615 / | 51.2 |
| | $r_{B8}$ −65.750 | $s_{B8}'$ 38.29 | | |
| | | Second focal plane $SE_2$ | | |
| | | $s_{C1}'$ −5.06 | | |
| $L_{C1}'$ | $r_{C1}'$ −13.9 | $d_{C1}'$ 1.08 | / 1.487 / | 70.4 |
| | $r_{C2}$ −7.94 | $l_{C1}'$ 13.0 | | |
| $L_{C2}'$ | $r_{C3}'$ +22.0 | $d_{C2}'$ 1.9 | / 1.620 / | 60.3 |
| | $r_{C4}'$ −34.0 | | | |

Figure 3:
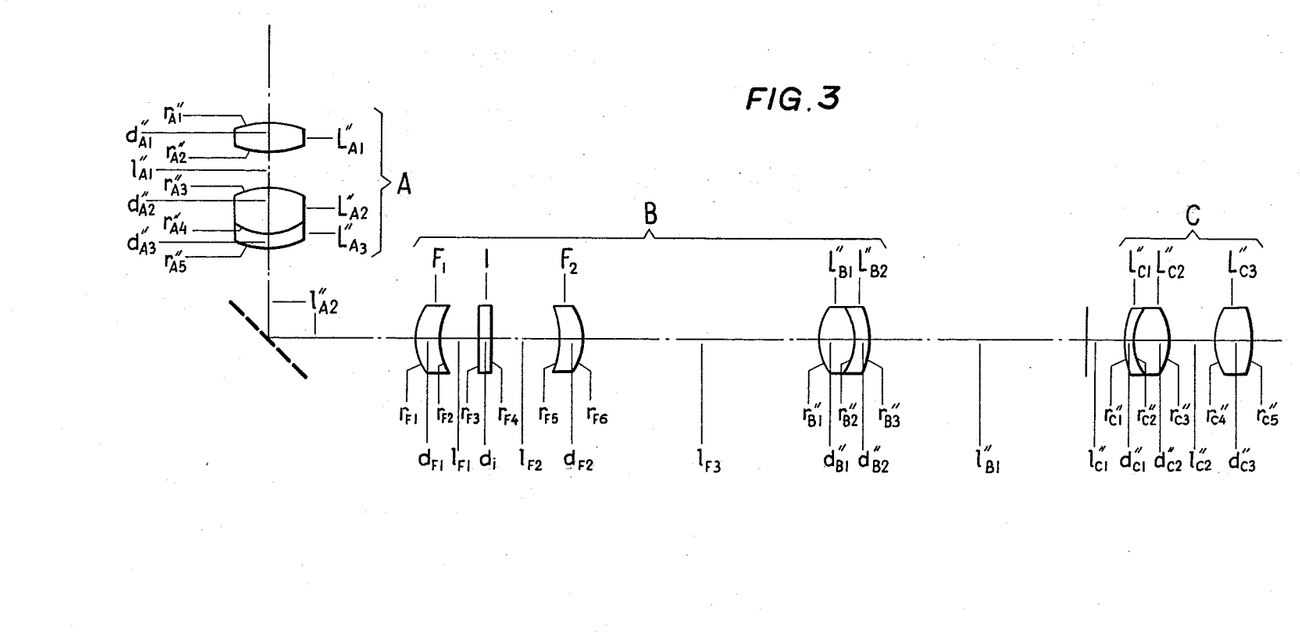
FIG. 3 is a sectional view of another view finder embodying our invention.

The view finder shown in FIG. 3 has an objective whose first group A includes a biconvex doublet $L''_{A2}$, $L''_{A3}$ replacing the meniscus $L_{A2}$ of FIGS. 1 and 1A. The second group B of this objective consists of two symmetrical positive menisci $F_1, F'_1$ with confronting concave surfaces, separated by a flat plate I, and a biconvex doublet $L''_{B1}, L''_{B2}$. Eyepiece C is composed of a positive doublet $L''_{C1}, L''_{C2}$ and a biconvex singlet $L''_{C3}$. The parameters of this view finder are given in Table VII. It is corrected for an intermediate image at a finite distance from lens $L_{A1}$ in the same way as the view finder of FIGS. 1 and 1A.

TABLE VII

|  | | | $n_d$ | $v_d$ |
|---|---|---|---|---|
| $L_{A1}''$ | $r_{A1}''$ +43.586 | $d_{A1}''$ = 1.7 | / 1.658 / | 50.9 |
| | $r_{A2}''$ −43.586 | $l_{A1}''$ = 2.8 | | $f_A$=18.70 |
| $L_{A2}''$ | $r_{A3}''$ +49.735 | $d_{A2}$ = 3.4 | / 1.658 / | 50.9 |
| $L_{A3}''$ | $r_{A4}''$ −10.020 | $d_{A3}''$ = 1.2 | / 1.805 / | 25.4 |
| | $r_{A5}''$ −27.179 | $l_{A2}''$ = 18.76 | | |
| $F_1$ | $r_{F1}''$ +12.481 | $d_{F1}$ = 2.0 | / 1.658 / | 50.9 |
| | $r_{F2}$ +22.628 | $l_{F1}$ = 2.71 | | |
| I | $r_{F3}$ ∞ | $d_i$ = 1.0 | /Plastic/ | |
| | $r_{F4}$ ∞ | $l_{F2}$ = 3.25 | | |
| $F_2$ | $r_{F5}$ −22.628 | $d_{F2}$ = 2.0 | / 1.658 / | 50.9 |
| | $r_{F6}$ −12.481 | $l_{F3}$ = 38.29 | | |
| $L_{B1}''$ | $r_{B1}''$ +25.250 | $d_{B1}''$ = 3.2 | / 1.683 / | 44.5 |
| $L_{B2}''$ | $r_{B2}''$ −8.083 | $d_{B2}''$ = 1.0 | / 1.805 / | 25.4 |
| | $r_{B3}''$ −21.469 | $l_{B1}''$ = 37.62 | | |
| | | $l_{C1}''$ = 9.29 | | |

TABLE VII-continued

|  |  |  |  | $n_d$ | $v_d$ |
|---|---|---|---|---|---|
| $L_{c1}''$ | $r_{c1}''$ +86.171 | $d_{c1}''$ =1.3 | | / 1.847 / | 23.8 |
| | $r_{c2}''$ +12.004 | | | | |
| $L_{c2}''$ | | $d_{c2}''$ = 6.2 | | / 1.620 / | 60.3 |
| | $r_{c3}''$ −17.000 | | | | |
| | | $l_{c2}''$ =4.0 | | | |
| | $r_{c4}''$ +15.658 | | | | |
| $L_{c3}''$ | | $d_{c3}''$ =4.5 | | / 1.603 / | 60.6 |
| | $r_{c5}''$ +185.300 | | | | |

Tables VIII and IX give alternate values for the parameters of lens group A of FIG. 3 in a view finder which forms an intermediate image of an object at infinite distance, projected by an afocal supplementary lens system, in the first focal plane $SE_1$ referred to above.

TABLE VIII

|  |  |  | $n_d$ | $v_d$ |
|---|---|---|---|---|
| $L_{A1}''$ | $r_{A1}''$ +27.986 | $d_{A1}''$ = 2.0 | / 1.724 / | 38.1 |
| | $r_{A2}''$ +150.000 | $l_{A1}''$ + 2.0 | | $f_A$=30.91 |
| | $r_{A3}''$ +17.000 | | | |
| $L_{A2}''$ | | $d_{A2}''$ = 3.7 | / 1.487 / | 70.4 |
| | $r_{A4}''$ −10.620 | | | |
| $L_{A3}''$ | | $d_{A3}''$ = 1.3 | / 1.805 / | 25.4 |
| | $r_{A5}''$ −72.382 | | | |
| | | $l_{A2}''$ = 19.09 | | |

TABLE IX

|  |  |  | $n_d$ | $v_d$ |
|---|---|---|---|---|
| $L_{A1}''$ | $r_{A1}''$ +25.250 | $d_{A1}''$ = 2.0 | / 1.623 / | 58.1 |
| | $r_{A2}''$ plane | $l_{A1}$ = 3.0 | | $f_A$=32.41 |
| | $r_{A3}''$ +19.039 | | | |
| $L_{A2}''$ | | $d_{A2}''$ = 4.0 | / 1.532 / | 48.8 |
| | $r_{A4}''$ −10.512 | | | |
| $L_{A3}''$ | | $d_{A3}''$ = 1.0 | / 1.805 / | 25.4 |
| | $r_{A5}''$ −614.079 | | | |
| | | $l_{A2}''$ = 19.01 | | |

We claim:

1. A camera comprising a taking objective centered on an axis and provided with several axially spaced components forming a dispersive front lens group and a collective rear lens group, beam-splitting means between said lens groups for diverting incident light rays onto an off-axial ray path, and a view finder in said ray path including a finder objective, an eyepiece and inverting lens means therebetween, said finder objective comprising chromatism-correcting lens means including a biconvex lens of relatively low refractive index and relatively high Abbé number and a negative-meniscus lens of relatively high refractive index and relatively low Abbé number, each radius of curvature of any lens of said finder objective exceeding 0.3 times the focal length of the finder objective, said negative-meniscus lens turning a concave side toward said beam-splitting means.

2. The camera defined in claim 1 wherein said relatively low refractive index ranges between substantially 1.48 and 1.74, said relatively high refractive index ranges between substantially 1.78 and 1.81, said relatively high Abbé number ranges between substantially 44 and 71, and said relatively low Abbe number ranges between substantially 25 and 26.

3. The camera defined in claim 1 wherein said inverting lens means comprises three air-spaced positive lens members.

4. The camera defined in claim 3 wherein said three positive lens members include a positive-meniscus lens proximal to said finder objective.

5. The camera defined in claim 1 wherein said biconvex lens and said negative-meniscus lens are singlets air-spaced from each other.

6. The camera defined in claim 5 wherein said biconvex lens lies proximal to said beam-splitting means.

7. The camera defined in claim 1 wherein said biconvex lens and said negative-meniscus lens are cemented to each other to form a doublet.

8. The camera defined in claim 7 wherein said finder objective further comprises a positive front lens between said beam-splitting means and said doublet.

9. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a biconvex lens of relatively high Abbé number and a negative-meniscus lens of relatively low Abbé number, each radius of curvature of any lens of said finder objective exceeding 0.3 times the focal length of the finder objective, said negative-meniscus lens turning a concave side toward said beam-splitting means; said eyepiece consisting of four air-spaced lens members, i.e. a biconcave singlet $L_{C1}$, two biconvex singlets $L_{C2}$, $L_{C3}$ and a planoconvex singlet $L_{C4}$, said lens members $L_{C1} - L_{C4}$ having radii of curvature $r_{C1} - r_{C8}$, thicknesses $d_{C1} - d_{C4}$, separations $l_{C1} - l_{C3}$, refractive indices $n_d$ and Abbé numbers $v_d$ substantially as listed in the following table:

|  |  |  |  | $n_d$ | $v_d$ |
|---|---|---|---|---|---|
| $L_{C1}$ | $r_{c1}$ = −19.78 | $d_{c1}$ = 1.2 | | / 1.755 / | 27.6 |
| | $r_{c2}$ = +19.78 | $l_{c1}$ = 0.5 | | | |
| | $r_{c3}$ = +24.17 | | | | |
| $L_{C2}$ | | $d_{c2}$ = 4.5 | | / 1.658 / | 50.9 |
| | $r_{c4}$ = −13.501 | $l_{c2}$ = 0.1 | | | |
| | $r_{c5}$ = +38.521 | | | | |
| $L_{C3}$ | | $d_{c3}$ = 4.5 | | / 1.623 / | 58.1 |
| | $r_{c6}$ = −38.521 | $l_{c3}$ = 0.1 | | | |
| | $r_{c7}$ = +19.714 | | | | |
| $L_{C4}$ | | $d_{c4}$ = 3.6 | | / 1.623 / | 58.1 |
| | $r_{c8}$ = ∞ | | | | |

10. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a biconvex lens $L_{A1}$ with radii of curvature $r_{A1}$, $r_{A2}$ and thickness $d_{A1}$ followed by a negative-meniscus lens $L_{A2}$ with radii of curvature $r_{A3}$, $r_{A4}$ and thickness $d_{A2}$, said negative-meniscus lens $L_{A2}$ being separated from said biconvex lens $L_{A1}$ by an air space $l_{A1}$; said radii $r_{A1} - r_{A4}$, thicknesses $d_{A1}$, $d_{A2}$ and air space $l_{A1}$, the refractive indices of said lenses $L_{A1}$, $L_{A2}$ and their Abbé numbers $v_d$ having numerical values substantially as given in the following table:

|  |  |  |  | $n_d$ | $v_d$ |
|---|---|---|---|---|---|
| $L_{A1}$ | $r_{A1} = +27.487$ | $d_{A1} = 2.3$ | | / 1.744 / | 44.8 |
| | $r_{A2} = -7.167$ | | $l_{A1} = 0.13$ | | |
| $L_{A2}$ | $r_{A3} = -6.100$ | $d_{A2} = 2.4$ | | / 1.805 / | 25.4 |
| | $r_{A4} = -9.360$ | | | | |

11. The improvement defined in claim 10 wherein said biconvex lens lies forwardly of said negative-meniscus lens, said finder objective having a focal length of substantially 12.075.

12. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a biconvex lens $L_{A1}$ with radii of curvature $r_{A1}$, $r_{A2}$ and thickness $d_{A1}$ followed by a negative-meniscus lens $L_{A2}$ with radii of curvature $r_{A3}$, $r_{A4}$ and thickness $d_{A2}$, said negative-meniscus lens $L_{A2}$ being separated from said biconvex lens $L_{A1}$ by an air space $l_{A1}$; said radii $r_{A1} - r_{A4}$, thicknesses $d_{A1}$, $d_{A2}$ and air space $l_{A1}$, the refractive indices of said lenses $L_{A1}$, $L_{A2}$ and their Abbé numbers $v_d$ having numerical values substantially as given in the following table:

|  |  |  |  | $n_d$ | $v_d$ |
|---|---|---|---|---|---|
| $L_{A1}$ | $r_{A1} = -23.798$ | $d_{A1} = 2.3$ | | / 1.641 / | 60.1 |
| | $r_{A2} = -6.151$ | | $l_{A1} = 0.15$ | | |
| $L_{A2}$ | $r_{A3} = -5.284$ | $d_{A2} = 2.0$ | | / 1.805 / | 25.4 |
| | $r_{A4} = -7.803$ | | | | |

13. The improvement defined in claim 12 wherein said biconvex lens lies forwardly of said negative-meniscus lens, said finder objective having a focal length of substantially 12.103.

14. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a biconvex lens $L_{A1}$ with radii of curvature $r_{A1}$, $r_{A2}$ and thickness $d_{A1}$ followed by a negative-meniscus lens $L_{A2}$ with radii of curvature $r_{A3}$, $r_{A4}$ and thickness $d_{A2}$, said negative-meniscus lens $L_{A2}$ being separated from said biconvex lens $L_{A1}$ by an air space $l_{A1}$; said radii $r_{A1} - r_{A4}$, thicknesses $d_{A1}$, $d_{A2}$ and air space $l_{A1}$, the refractive indices of said lenses $L_{A1}$, $L_{A2}$ and their Abbé numbers $v_d$ having numerical values substantially as given in the following table:

|  |  |  |  | $n_d$ | $v_d$ |
|---|---|---|---|---|---|
| $L_{A1}$ | $r_{A1} = +20.0$ | $d_{A1} = 2.0$ | | / 1.620 / | 60.3 |
| | $r_{A2} = -6.524$ | | $l_{A1} = 0.4$ | | |
| $L_{A2}$ | $r_{A3} = -5.5$ | $d_{A2} = 1.0$ | | / 1.785 / | 25.8 |
| | $r_{A4} = -8.177$ | | | | |

15. The improvement defined in claim 14 wherein said biconvex lens lies forwardly of said negative-meniscus lens, said finder objective having a focal length of substantially 12.460.

16. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a positive front lens $L''_{A1}$ with radii of curvature $r''_{A1}$, $r''_{A2}$ and thickness $d''_{A1}$ followed by a doublet consisting of a biconvex lens $L''_{A2}$ with radii of curvature $r''_{A3}$, $r''_{A4}$ and thickness $d''_{A2}$ cemented onto a negative-meniscus lens $L''_{A3}$ with radii of curvature $r''_{A4}$, $r''_{A5}$ and thickness $d''_{A3}$, said positive front lens $L''_{A1}$ being separated from said doublet $L''_{A2}$, $L''_{A3}$ by an air space $l''_{A1}$; said radii $r''_{A1} - r''_{A5}$, thicknesses $d''_{A1} - d''_{A3}$ and air space $l''_{A1}$, the refractive indices of said lenses $L''_{A1} - L''_{A3}$ and their Abbé numbers $v_d$ having numerical values substantially as given in the following table:

|  |  |  |  | $n_d$ | $v_d$ |
|---|---|---|---|---|---|
| $L''_{A1}$ | $r''_{A1} = +43.586$ | $d''_{A1} = 1.7$ | | / 1.658 / | 50.9 |
| | $r''_{A2} = -43.586$ | | $l''_{A1} = 2.8$ | | |
| $L''_{A2}$ | $r''_{A3} = +49.735$ | $d''_{A2} = 3.4$ | | / 1.658 / | 50.9 |
| | $r''_{A4} = -10.020$ | | | | |
| $L''_{A3}$ | | $d''_{A3} = 1.2$ | | / 1.805 / | 25.4 |
| | $r''_{A5} = -27.179$ | | | | |

17. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a positive front lens $L''_{A1}$ with radii of curvature $r''_{A1}$, $r''_{A2}$ and thickness $d''_{A1}$ followed by a doublet consisting of a biconvex lens $L''_{A2}$ with radii of curvature $R''_{A3}$, $r''_{A4}$ and thickness $d''_{A2}$ cemented onto a negative-meniscus lens $L''_{A3}$ with radii of curvature $r''_{A4}$, $r''_{A5}$ and thickness $d''_{A3}$, said positive front lens $L''_{A1}$ being separated from said doublet $L''_{A2}$, $L''_{A3}$ by an air space $l''_{A1}$; said radii $r''_{A1} - r''_{A5}$, thicknesses $d''_{A1} - d''_{A3}$ and air space $l''_{A1}$, the refractive indices of said lenses $L''_{A1} - L''_{A3}$ and their Abbé numbers $V_d$ having numerical values substantially as given in the following table:

|  |  |  | $n_d$ | $v_d$ |
|---|---|---|---|---|
| $L_{A1}''$ | $r_{A1}'' = +27.986$ | | | |
| | $r_{A2}'' = +150.000$ | $d_{A1}'' = 2.0$ / 1.724 / | 38.1 |
| | | $l_{A1}'' = 2.0$ | | |
| | $r_{A3}'' = +17.000$ | | | |
| $L_{A2}''$ | | $d_{A2}'' = 3.7$ / 1.487 / | 70.4 |
| | $r_{A4}'' = -10.620$ | | | |
| $L_{A3}''$ | | $d_{A3}'' = 1.3$ / 1.805 / | 25.4 |
| | $r_{A5}'' = -72.382$ | | | |

18. In a camera comprising a taking objective centered on an axis and provided with several axially spaced components, beam-splitting means between two of said components for diverting incident light rays onto an off-axial ray path, and a view finder in said ray path including a finder objective, an eyepiece and inverting lens means therebetween, the improvement wherein said finder objective comprises achromatic lens means including a positive front lens $L''_{A1}$ with radii of curvature $r''_{A1}$, $r''_{A2}$ and thickness $d''_{A1}$ followed by a doublet consisting of a biconvex lens $L''_{A2}$ with radii of curvature $R''_{A3}$, $r''_{A4}$ and thickness $d''_{A2}$ cemented onto a negative-meniscus lens $L''_{A3}$ with radii of curvature $r''_{A4}$, $r''_{A5}$ and thickness $d''_{A3}$, said positive front lens $L''_{A1}$ being separated from said doublet $L''_{A2}$, $L''_{A3}$ by an air space $l''_{A1}$; said radii $r''_{A1} - r''_{A5}$, thicknesses $d''_{A1} - d''_{A3}$ and air space $l''_{A1}$, the refractive indices of said lenses $L''_{A1} - L''_{A3}$ and their Abbé numbers $v_d$ having numerical values substantially as given in the following table:

|  |  |  | $n_d$ | $v_d$ |
|---|---|---|---|---|
| $L_{A1}''$ | $r_{A1}'' = +25.250$ | $d_{A1}'' = 2.0$ / 1.623 / | 58.1 |
| | $r_{A2}'' = \infty$ | | | |
| | | $l_{A1}'' = 3.0$ | | |
| | $r_{A3}'' = +19.039$ | | | |
| $L_{A2}''$ | | $d_{A2}'' = 4.0$ / 1.532 / | 48.3 |
| | $r_{A4}'' = -10.512$ | | | |
| $L_{A3}''$ | | $d_{A3}'' = 1.0$ / 1.805 / | 25.4 |
| | $r_{A5}'' = -614.079$ | | | |

\* \* \* \* \*